Feb. 18, 1958 P. DOERSELN ET AL 2,823,447
VERTICAL EJECTOR TOOL HOLDER
Filed July 27, 1953 2 Sheets-Sheet 1
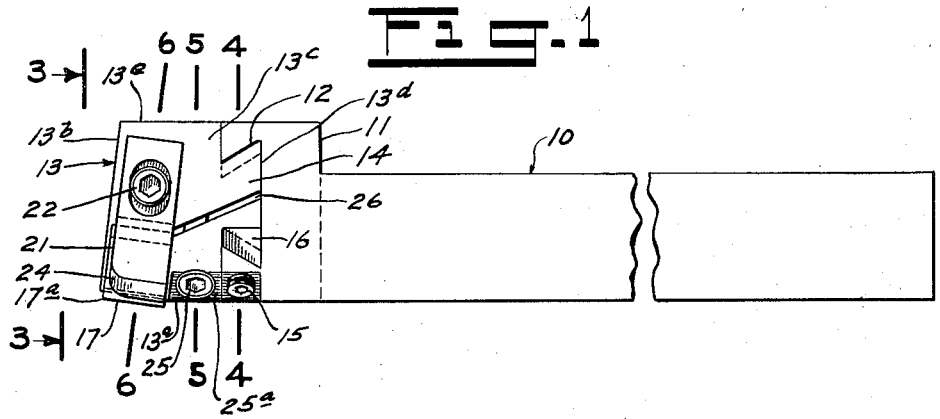
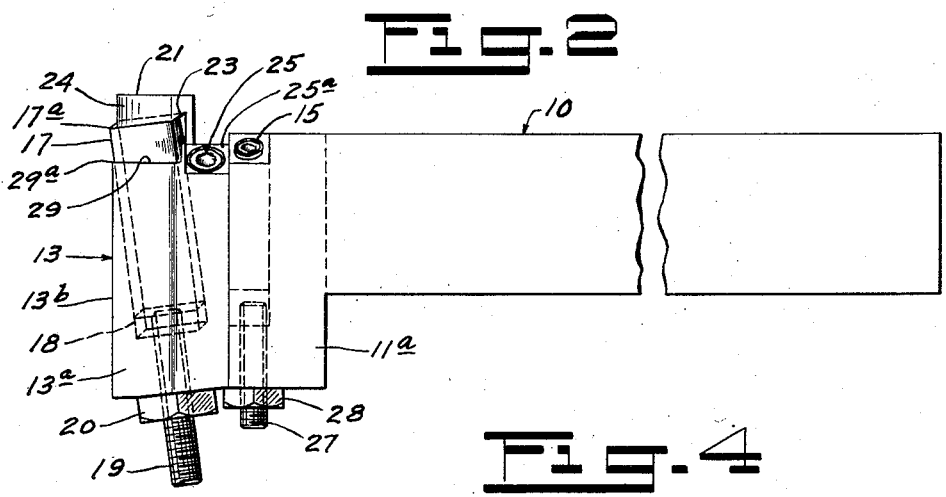
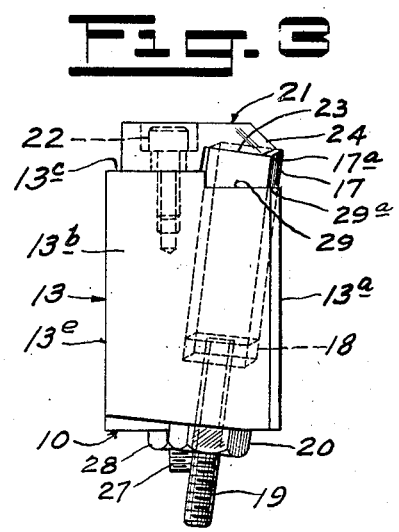
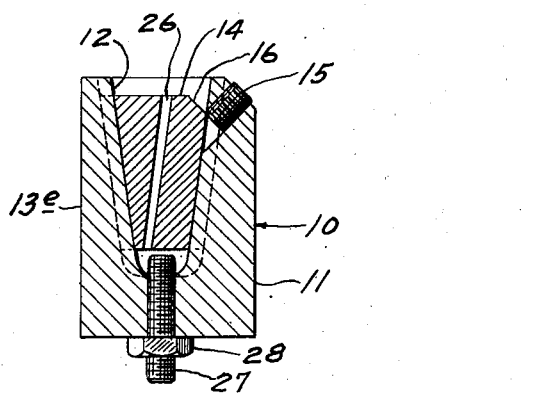
INVENTORS
PAUL DOERSELN
KENNETH PAUL DOERSELN
BY
ATTORNEY

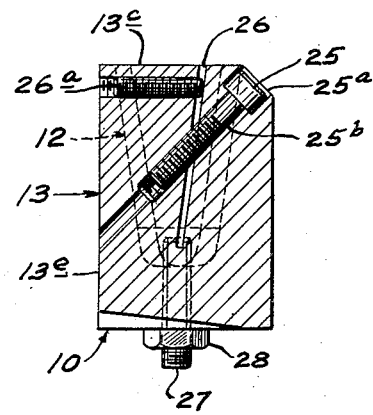
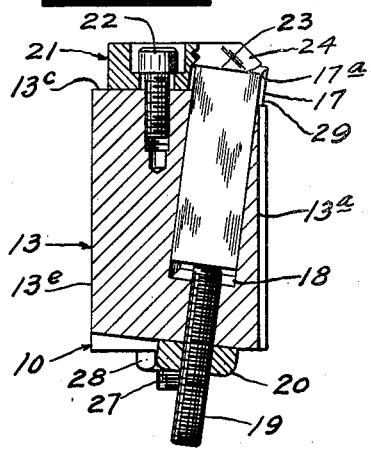
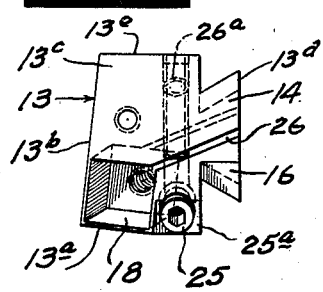
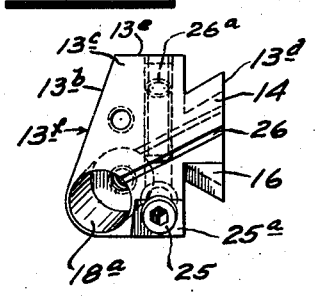
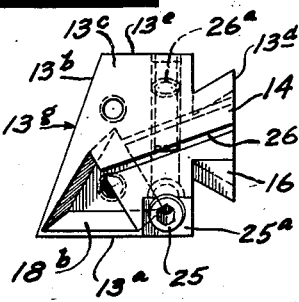
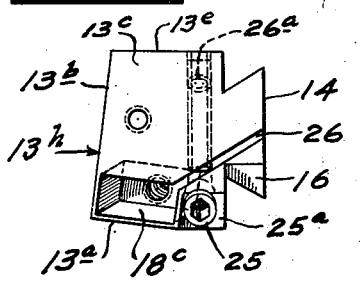

United States Patent Office 2,823,447
Patented Feb. 18, 1958

2,823,447

VERTICAL EJECTOR TOOL HOLDER

Paul Doerseln, Hawthorne, and Kenneth Paul Doerseln, Haledon, N. J.

Application July 27, 1953, Serial No. 370,377

1 Claim. (Cl. 29—96)

Our invention relates to an improvement in tool holders, mainly vertical ejector tool holders, and has for its principal object the provisions of a tool holder in which the tool bit is rigidly supported, readily adjustable and easily removable and which forms an anchor and is separable from the main shaft of the tool holder.

At the present time there is no vertical ejector tool holder on the market which is composed of a main shaft having a shoulder thereon and a female dove-tail insert, into which a male dove-tail can be inserted and fastened in such a manner so that it can be removed at any time in order to insert a new tool holder head.

The purpose of the tool holder being not only to hold square and rectangular tool bits, but also to hold circular and triangular tool bits, or any other shape of tool bits without being obliged to use an entirely new tool holder.

The tool shank is a permanent part of our tool and contains as previously stated a female dove-tail which is arranged in such a manner that it can be locked with the other portion of the tool holder so that when the male portion of the dove-tail is attached to the female portion of the dove-tail, it interlocks and in effect forms a solid tool holder, yet has all other features of a solid one piece tool holder and the added advantage of being able to remove just the tool holder head portion in order to insert a different type of tool holder head, or in order to insert a new tool bit or tool holder head upon destruction and/or wear of the tool bit or tool holder head without changing the tool holder assembly.

This type of tool holder could readily be termed an anchor ejection tool holder. In other words, the tool holder portion is anchored to the main shaft of the tool holder and can be readily ejected when a new tool holder is necessary and/or a different type of tool holder is necessary.

Our invention also contains a chip breaker, which also aids in supporting the tool bit as well as serving to break the chips.

Another object of our tool holder is to form a solid front support to enclose the tool bit, as the present form of vertical ejector tool holders have opened surfaces about the cutting edge and no solid front support, which open surfaces weaken the tool holder structure, causing vibration of the tool bit and also causing considerable breakage of the cutting edge of the tool bit, which leads to defective work and decreases the efficiency of that type of tool holder. In some of the present types of tool holders having open surfaces about the cutting edge, tool bits are clamped with bands, yokes, or other clamping members. However, said adjustable metal bands, etc. soon loosen up and their value as a stabilizer is thus lost and they generally form a springing action and a leverage is affected between the main portion of the tool holder and the metal retaining band attached below the cutting edge of the tool bit. They have been found to be very inefficient, break readily, and do not stand up under the terrific strain to which this type of tool holder is generally subjected, to wit principally in the metal-removing industry, wherein speed and mass production are essential and desirable. Furthermore, said types of tool holders are not reparable and are thus expensive to use, due to the short life and inefficiency while in use.

Fig. 1, plan view of a tool holder made according to the invention.

Fig. 2, side elevation of Fig. 1.

Fig. 3, front elevation looking into the direction of the arrows 3—3 in Fig. 1.

Fig. 4, second view taken on the line 4—4 of Fig. 1.

Fig. 5, second view taken on the line 5—5 of Fig. 1.

Fig. 6, second view taken on the line 6—6 of Fig. 1.

Fig. 7 illustrates a plan view of a tool holder for square tool bits.

Fig. 8, plan view of a tool holder for round tool bits.

Fig. 9, tool holder for triangular tool bits.

Fig. 10, tool holder for rectangular tool bits.

Referring to the drawings:

Our improved tool holder has the shank portion, 10, having an integral end portion 11, into which is machined a female dove-tail 12, for receiving male dove-tailed portion 14, of the tool holder head 13. The tool holder head 13, containing the male dove-tailed portion 14, is slotted at 26 (Fig. 1) for clamping purposes. The tool holder head 13 is held in position in the shank 10, for reverse use by the lock screw 15, as shown in Fig. 4. Lock screw 15 locks the tool holder head by exerting pressure on bevel surface 16 of the male dove-tailed portion 14 of the tool holder head 13. The tool bit 17 slideably fits into the well 18, which is most clearly shown in Fig. 7. On the tool holder head 13 may be provided a chip breaker 21, which also aids in holding the tool bit 17. The set screw 19 is used as a supporter for the insert and may be provided with a jam nut 20. The chip breaker 21 may, or may not, be provided with a beveled front edge 24, as shown in Fig. 3, as desired. The chip breaker is fastened in position by means of the screw 22. The tool bit 17 is securely clamped by means of the split 26 in the male dove-tail 14, placed into the female dove-tail 12, in the end portion of the shank 11. The screw 25, when tightened, tends to close up the slot 26, which also aids in holding the tool bit 17 (Fig. 5).

The set screw 26a is provided to expand the dove-tailed portion 14, so as to aid in removing the tool bit 17.

The screw 27, in the shank 10, is used basically as a support screw and can also be used in case of difficulty in removing the head portion 13 from the shank 10. The support screw 27 may be provided with a jam nut 28.

The top edge 29, of the well 18, is machined down below to a point where the corner 29a, would be inside of a vertical line projected upward to the corner 17a of the tool bit 17. See Fig. 2.

To assemble the tool holder, which is in two separate units, one unit of which consists of shank 10 and end portion 11. Said end portion 11, having shoulder 11a, and said end portion 11, projecting below the shank portion 10, as shown and designated as 11a. Said end portion 11, having a support screw 27, through the center of its bottom portion at the apex of the female dove-tail 12. Said female dove-tail 12, extends approximately ¾ of the length of said front end 11, of shank 10. The front face of said female dove-tail 12, being opened and being flush with the outer surface of said end portion 11. Said female dove-tail 12, having on its upper face corner thereof a beveled surface 16, being slightly below the upper edge of said shank 10, and containing a locking screw 15, the male dove-tail 14 is provided with a bevel surface 16 upon which the inner end of the locking screw 15 bears against said bevel 16 to lock said tool head into position as illustrated in Fig. 4, screw 15 also acts as a clamping means for clamping the tool bit in position as well as screw 25 as previously stated.

The other unit of said tool holder consisting of tool holder head 13, having a male dove-tail 14, which can be anchored in said female dove-tail 12, as previously described.

Said male dove-tail 14, is shown on said drawings. Said male dove-tail 14, being flush with the top surface 13c, of tool holder head 13, and extending approximately ⅔ of the height of tool holder head 13, and may be offset from the face surface 13b, of said tool holder head 13. Said male dove-tail 14, having its face surface 13a, of said male dove-tail 14, as a beveled surface 16 (Fig. 1) against which lock screw 15, acts as a locking member. Said male dove-tail 14, and tool holder unit 13, containing a slot 26 (Fig. 1) and extending through the rear side 13d, of tool holder head 13, and said male dove-tail 14, and extending the length of said male dove-tail 14, and at an approximate 7° angle, and extending to tool bit well 18. Said tool bit well 18, extending about ¾ of the length of tool holder head 13. Said well portion 18, having two outer surfaces, one such surface being face surface 13a, and the other surface being head surface 13b, integral with said tool holder head 13, said surfaces having proper clearance angles. Adjacent said well 18, on tool holder head 13, and top surface 13c, at a 45° angle, is a bevel 25a, which bevel 25a, contains a bore, 25b, said bore, 25b, being approximately at a 45° angle. Said bore, 25b, going through free, through the face side 13a, of the tool holder head 13, to slot 26, and continuing through slot 26, with a tapped hole, which tapped hole contains clamping screw 25, said clamping screw 25, clamps the tool bit 17, securely in well 18, and also adds rigidity to the tool holder head 13. Said tool holder head 13, having in the bottom thereof and extending through the well portion 18, a supporting screw 19, said supporting screw 19, may have a lock nut 20 attached to said supporting screw 19. Said supporting screw 19, being to support the tool bit 17, and to adjust the tool bit 17, to its cutting position in order to use up the maximum amount of the tool bit 17, or approximately within ⅜ inch of the original 1½ inch length of the tool bit. Said tool holder head 13, having on its opposite, or inner surface 13e, adjacent to the rear portion of the male dove-tail 14, and near the top surface 13c, of said tool holder head 13, is releasing screw 26a, which said screw serves to release the tool bit 17. In fact, it has been found from experience and experiments that the two tool holder head units, 13, and shank 10, when fastened together, act as a solid unit.

At the top point where the surfaces 13a, and 13b, of the tool holder head 13, meet, the edges adjacent the tool bit well 18 are machined down to form the edge 29, point 29a, being inside the cutting point 17a of tool bit 17, as seen in (Fig. 2).

Attached to the top surface of tool holder head 13, may be what we term a chip breaker 21, extending above the top surface of tool bit 17, to within a slight portion of the outer edge, or cutting edge, of tool bit 17, and approximately the whole thickness of tool bit 17, in order to break the chips as they come from the piece of the material being machined. It also adds rigidity to the tool. Said chip breaker having a slot portion in order to make the proper adjustment on said tool bit 17, when worn off.

Figures 1 to 10, inclusive, show the square, round, triangular, rectangular, or different tool bits which may be used. In Fig. 8, 13f, is the tool holder head for a round tool bit and 18a, is the tool bit well for the same, and, in Fig. 9, 13g, is the tool holder head for a triangular tool bit and 18b, is the tool bit well for same, and in Fig. 10, 13h is the tool holder head for a rectangular tool bit, and 18c, is the tool bit well for same.

As the tool bit 17, is worn in use, it can be indexed (turned about) in well 18, and at the same time can be raised by supporting screw 19, to the desired height and the supporting screw may be locked at that height by lock nut 20.

By the use of our tool holder, it is possible to use within ⅜ of an inch, or better, of the entire tool bit 17, where in most tool holders it is only possible to use within ½ inch or ¾ inch, or longer, of the tool bits, which are originally 1½ inches long.

Furthermore, our tool holder well has enclosed faces, and clamps the tool bit solidly on all four sides. If tool holder head 13, should wear out, it is only necessary to attach a new tool holder head 13, and the entire shank length 10, can be saved, which, in today's market, costs at least $8 to $10 or more.

By the use of our tool holder head 13, in conjunction with shank 10, it is possible to change from a square, or rectangular tool bit well tool holder head, to a round, or triangular tool bit well tool holder head, or a tool holder head of any other type well, without changing the shank portion 10, and also without removing the shank portion 10, from the machine, which means considerable saving in time and labor and materials.

The clamping screw 25, which clamps the tool bit 17, in place and lock screw 15, which holds the tool holder head 13, in place in shank 10, are located in such a manner that they can be operated from the top so that if several of these tool holders are ganged adjacent, and parallel, as they often are in the metal removing industry, the tool bit 17, can be readily changed, or an entirely new tool holder head 13, can be inserted if it is desired to have a new tool bit 17, or a different type of tool bit, such as a round or a triangular tool bit, without disassembly from the machine. This also means a considerable saving in not only materials, but in time and labor.

It is also important to have releasing screw 26a, to expand the well portion 18, in order to release the tool bit 17, so that the tool bit 17, can be removed, or indexed.

It is to be noted that when male dove-tail 14, fits into female dove-tail 12, male dove-tail 14, drops down a slight bit, preferably about ⅛ of an inch from the top surface of shank 10, so that the tool bit 17, which projects about ⅛ of an inch above tool holder head 13, and the cutting edge of tool bit 17, is in line with the top surface of shank 10, which is the center of lathe.

While we have illustrated several embodiments of our invention, we do not intend to limit ourselves to those particular means, methods, and materials, as it is apparent that other means, methods, and materials may be employed for obtaining the same results within the scope of the appended claims and without departing from the scope or spirit of our invention.

We claim:

A tool holder having, in combination, two parts, one part being a shank, and the other part being a tool holder head, said tool holder head having a male dove-tail at its rear end, and a well at the front end, said well being off center and to the left of said tool holder head and along one side of said tool holder head adjacent to the front end of said tool holder head, a slot through said male dove-tail and through said well, said slot being at a slight angle to the vertical, a clamping means adjacent to said well and passing through said slot at an angle to the vertical to clamp a tool bit in said well, said means clamping said well about the entire length of said tool bit, and effecting a solid clamping of said tool bit, said shank portion containing a female dove-tail and locking means, to secure the tool holder head and said shank as a solid unit, said locking means together with said dove-tail, also effecting an additional locking means of said tool bit, said means also acting as a releasing means of said tool holder head from said shank and as a releasing means of said tool bit from said tool holder head, and means to expand said slot in said tool holder head, said means being near the top of said tool holder head and said means also effecting a release of said tool bit, said tool holder well being rectangular, and extending to within a slight distance of the bottom of said tool holder head, and the top outer portion of said tool holder head being open to permit an exposure and use of said tool bit, said sundry clamping means permitting the use of practically the entire tool bit.

References Cited in the file of this patent

UNITED STATES PATENTS

| | | |
|---|---|---|
| 790,479 | Carr | May 23, 1905 |
| 954,049 | Quast | Apr. 5, 1910 |
| 1,434,782 | Lange et al. | Nov. 7, 1922 |
| 1,854,672 | Robinson | Apr. 19, 1932 |
| 1,855,971 | Kilmer | Apr. 26, 1932 |
| 2,266,339 | Shultz | Dec. 16, 1941 |
| 2,556,723 | Hoffart | June 12, 1951 |
| 2,644,224 | Chilcott et al. | July 7, 1953 |
| 2,645,844 | Longe | July 21, 1953 |
| 2,659,962 | Doerseln | Nov. 24, 1953 |
| 2,680,897 | Murphy | June 15, 1954 |
| 2,690,609 | Greenleaf | Oct. 5, 1954 |
| 2,697,866 | Greenleaf | Dec. 28, 1954 |
| 2,710,442 | Ranous | June 14, 1955 |